(12) United States Patent
Guidotti et al.

(10) Patent No.: US 10,883,850 B2
(45) Date of Patent: Jan. 5, 2021

(54) ADDITIONAL SECURITY INFORMATION FOR NAVIGATION SYSTEMS

(71) Applicant: INTERNATIONAL BUSINESS MACHINES CORPORATION, Armonk, NY (US)

(72) Inventors: Alice Guidotti, Rome (IT); Fabio Cerri, Rome (IT); Daniele Morgantini, Rome (IT); Marco Vettori, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/122,477

(22) Filed: Sep. 5, 2018

(65) Prior Publication Data

US 2020/0072637 A1  Mar. 5, 2020

(51) Int. Cl.
*G01C 21/36* (2006.01)
*G01C 21/34* (2006.01)

(52) U.S. Cl.
CPC ..... *G01C 21/3697* (2013.01); *G01C 21/3461* (2013.01)

(58) Field of Classification Search
None
See application file for complete search history.

(56) References Cited

U.S. PATENT DOCUMENTS

| | | | |
|---|---|---|---|
| 6,862,524 B1 | 3/2005 | Nagda et al. | |
| 8,606,512 B1 | 12/2013 | Bogovich et al. | |
| 8,612,139 B2 * | 12/2013 | Wang | G01C 21/3461 701/400 |
| 9,390,607 B2 * | 7/2016 | Bell | G08B 21/02 |
| 9,996,883 B2 * | 6/2018 | Bogovich | G06Q 40/08 |
| 2008/0033644 A1 * | 2/2008 | Bannon | G01C 21/3461 701/414 |
| 2008/0094230 A1 * | 4/2008 | Mock | G08B 1/08 340/573.4 |
| 2010/0036599 A1 * | 2/2010 | Froeberg | G01C 21/3461 701/532 |
| 2010/0100319 A1 | 4/2010 | Trinko et al. | |
| 2012/0179363 A1 | 7/2012 | Pierfelice | |
| 2012/0232787 A1 | 9/2012 | Kunath et al. | |
| 2016/0117921 A1 | 4/2016 | D'Amato et al. | |
| 2017/0158191 A1 | 6/2017 | Bills et al. | |

(Continued)

FOREIGN PATENT DOCUMENTS

EP   2498059 A1   9/2012

*Primary Examiner* — Abdhesh K Jha
(74) *Attorney, Agent, or Firm* — Cuenot, Forsythe & Kim, LLC (57) ABSTRACT

A computer-implemented method for enhancing navigation systems and maps with security-related information includes receiving, by a computer, a map comprising one or more security areas; and also receiving dynamic information about respective conditions related to each of the one or more security areas and respective security attributes related to each of the one or more security areas. Furthermore, the computer calculates a respective risk value for each of the one or more security areas based on the respective conditions and the respective security attribute of the security area; and transmits to a user device associated with a user, risk-related information based on a current location of the user device and the respective risk values.

18 Claims, 4 Drawing Sheets

(56) References Cited

U.S. PATENT DOCUMENTS

| | | | |
|---|---|---|---|
| 2018/0341261 A1* | 11/2018 | Kislovskiy | G01C 21/3438 |
| 2019/0146509 A1* | 5/2019 | Dean | G01C 21/3492 |
| | | | 701/25 |
| 2019/0196472 A1* | 6/2019 | Korner | G01C 21/32 |
| 2019/0347739 A1 | 11/2019 | Fuchs | |

* cited by examiner

ADDITIONAL SECURITY INFORMATION FOR NAVIGATION SYSTEMS

BACKGROUND

The present invention relates to navigation systems, and more specifically, to enhancing the types of information provided to a user of a navigation system.

In general, a navigation assistance system provides route information to a user device or a user's vehicle. Typically, the vehicle includes a GPS system that allows the navigation assistance system to track a location of the vehicle. Furthermore, the navigation assistance system can receive an intended destination of the vehicle and analyze map-related information to identify a suggested route for the vehicle. The route can be comprised of a number of segments and the system can include alternative segments so as to provide a user or driver with more than one possible route for reaching the intended destination. The route can be updated by the system based on externally received data such as current traffic reports. Many algorithms are known and employed to identify routes and segments of routes between two locations.

SUMMARY

A computer-implemented method includes receiving, by a computer, a map comprising one or more security areas; and also receiving dynamic information about respective conditions related to each of the one or more security areas and respective security attributes related to each of the one or more security areas. Furthermore, the computer calculates a respective risk value for each of the one or more security areas based on the respective conditions and the respective security attribute of the security area; and transmits to a user device associated with a user, risk-related information based on a current location of the user device and the respective risk values.

A system includes a processor programmed to initiate executable operations. In particular, the operations include receiving a map comprising one or more security areas; receiving dynamic information about respective conditions related to each of the one or more security areas; receiving respective security attributes related to each of the one or more security areas; calculating a respective risk value for each of the one or more security areas based on the respective conditions and the respective security attribute of the security area; and transmitting to a user device associated with a user, risk-related information based on a current location of the user device and the respective risk values.

A computer program product which includes a computer readable storage medium having program code stored thereon. The program code is executable by a data processing system to initiate operations including: receiving, by the data processing system, a map comprising one or more security areas; receiving, by the data processing system, dynamic information about respective conditions related to each of the one or more security areas; receiving, by the data processing system, respective security attributes related to each of the one or more security areas; calculating, by the data processing system, a respective risk value for each of the one or more security areas based on the respective conditions and the respective security attribute of the security area; and transmitting, by the data processing system to a user device associated with a user, risk-related information based on a current location of the user device and the respective risk values.

DETAILED DESCRIPTION

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

Embodiments in accordance with the principles of the present disclosure relate to a system to improve drivers' safety, by adding security information to the maps used by GPS navigator systems. The system can also suggest an appropriate route based on the security of the route itself, on the type of vehicle and on the user's preferences (including the security preferences that the user specifies). In addition, the systems can provide real time information regarding the security of the route that the driver is following.

As explained in more detail below, the system can utilize many different techniques for collecting information such as image recognition of road signs (using image tagging) e.g., leveraging ADAS system, processing of information related to traffic and accidents from specialized data services; where and how the accident occurred, which kind of vehicles are involved, processing of information from vehicles' sensors e.g., unsealed roads, dangerous turns, processing of information on general behavior of the drivers (meaning how they react to a particular road e.g., driving closer to the center of the road or closer to the extreme side of the road to avoid something or driving considerably slower because there is poor visibility), processing of conversations occurring inside the car (e.g., "watch out, there is a hole in the asphalt", "take left, the road is larger", and so on), process information from map services that relate to safety issues (e.g., barriers), and explicit user feedback.

Based on this collected information, data can be included in the visual maps provided to an in-vehicle display. The above data can be used to enhance the maps with visual security indicators, such as a 3D appearance of the road or additional information, such as the replication of the road sign itself, and alerts (text, image and voice). In some instances, the security information can, for example, depend on the kind of vehicle. A route that is dangerous for motorbikes might not be dangerous for SUVs. The security information can also take into consideration external conditions such as weather (rain, snow, ice), light conditions (are there artificial lights at night or not?), and traffic. Ultimately, the security/safety information is used as part of the decision algorithm to select or suggest routes to a destination. The suggestion of the route can be based (in addition to current parameters) on the security information with regards to the type of vehicle the user is driving (motorbike, scooter, sports car, SUV, etc.), and on user-specified preferences with respect to safety/risk. The system can be used without a destination being specified and can merely show the safety/security information around the vehicle's current location.

As compared to the conventional navigation assistance or maps application, a user can now be advised in real-time about security issues that are profiled to his/her vehicle, and to his/her user profile (driver attributes). Similarly, routes to a destination can now be calculated based on the same paradigm and different routes can be proposed with different levels of security exposure depending on the vehicle, driver and the actual conditions that can influence security (weather, traffic, accidents etc.).

Figure 1:
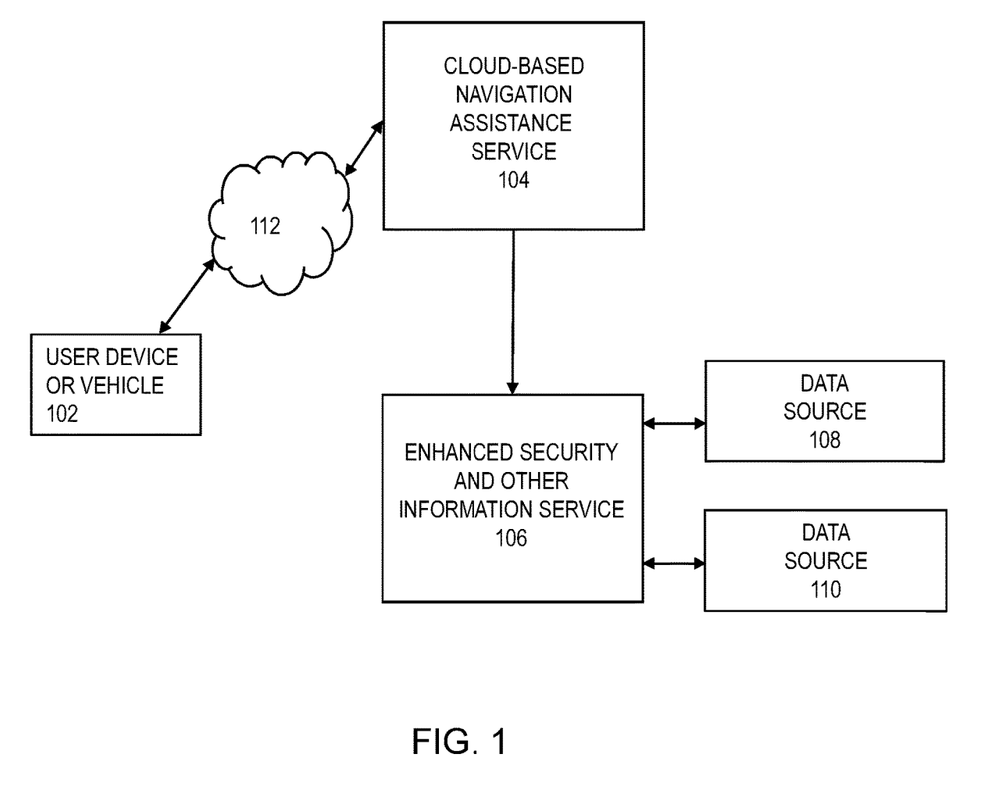
FIG. 1 illustrates a high-level overview of systems operating in accordance with the principles of the present disclosure.

FIG. 1 illustrates a high-level overview of systems operating in accordance with the principles of the present disclosure. In general, a navigation assistance service 104 provides route information to a user device or user vehicle 102. Typically, the vehicle 102 includes a GPS system that allows the navigation assistance service 104 to track a location of the vehicle 102. Furthermore, the navigation assistance service 104 can receive an intended destination of the vehicle 102 and analyze map-related information to identify a suggested route for the vehicle 102. The route can be comprised of a number of segments and the service 104 can include alternative segments so as to provide a user or driver with more than one possible route for reaching the intended destination. The route can be updated by the service 104 based on externally received data such as traffic reports and accident reports. Furthermore, in at least some embodiments the maps can work either online or offline (meaning that updated maps are downloaded on the user device) and only real time/dynamic information require an internet connection.

Within the vehicle a graphical display is often provided that shows the route the vehicle 102 is travelling as well as a short distance ahead to provide the driver enough time to navigate the route safely. The displayed map can include symbols such as route numbers, exit numbers prominent landmarks.

Figure 2:
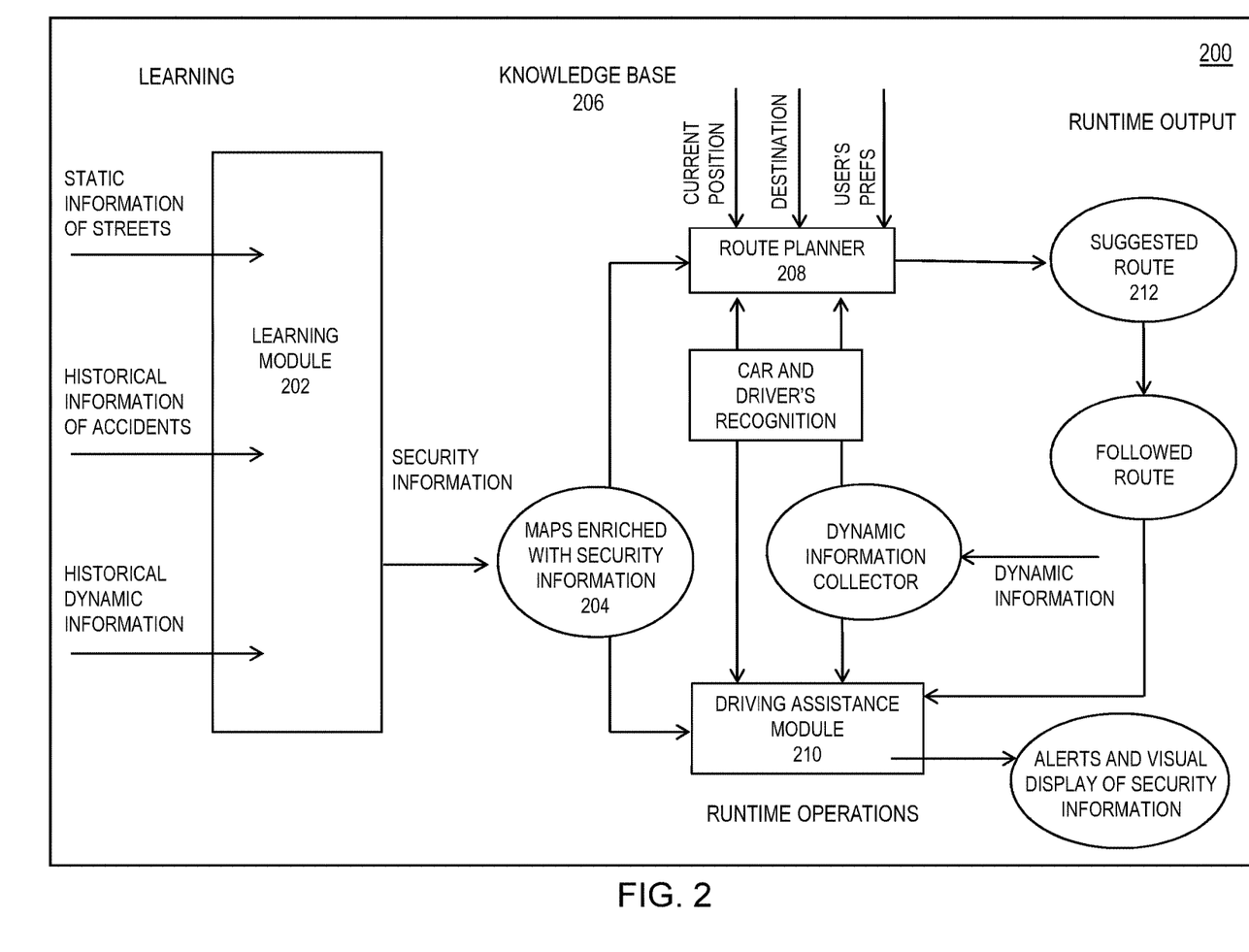
FIG. 2 illustrates an example system that combines the functionality of a navigation assistance service and an enhanced information service in accordance with the principles of the present disclosure.

Embodiments in accordance with the present disclosure provide enhanced information via a service 106 to the algorithms that select possible routes and route segments as well as to the information included in a map that graphically displayed to a driver or other user. In particular, the enhanced information is related to the security or safety of a route. As explained below, the enhanced information service 106 receives information from a number of different data source 108, 110 and determines a risk score for different portions of a map. In determining the risk score, the service 108 can also identify individual elements associated with a section of the road so that when a map is displayed to the driver for that section, the map includes graphical symbols representing those elements. Additionally, the displayed security information can depend on current conditions, for instance it could be dependent on the weather or on the user's and vehicle's characteristics. Each user has a different experience when interacting with the system An example system that combines the functionality of the navigation assistance service 104 and the enhanced information service 106 is depicted in FIG. 2. The system 200 can include a Learning Module 202 that acquires and relates static security information of streets (such as road conditions, dangerous curves, etc.), history of dynamic information (such as weather conditions, lights, etc.) and relates them with history of events, these being mainly accidents (but it could also be the acquired trajectory of the vehicle on that road segment, for instance). As an output the learning module enriches the maps with the security information. The map is divided in security areas that are relevant to the user when he/she reaches them with a specific vehicle and under certain (dynamic) conditions (e.g., weather, visibility conditions, traffic etc.). In general, the Learning Module 202 can process static inputs to acquire security/safety information of streets (e.g., road conditions, dangerous curves, etc.). The term "static" is not meant to imply that the information never changes but that it is the type of information that remains relatively the same for days. However, when changes do occur the Learning Module 202 can receive and process that updated information. This module 202 can use a variety of inputs to derive relatively static information about possible roads and routes. Example inputs can include security information from third party services (e.g., barriers and restrictions from OpenStreetMap, road signs (i.e., vertical and horizontal signs registered via a camera and then recognized and classified) and road images (cameras), a history of accidents occurring on particular spots or road sections (e.g., CrashMap, Google, etc.), sensors data from sensors on the car, such as gyroscopes or accelerometers, that can measure an incline/decline of the car or other forces indicative of sharp turns, driver behavior such as collected from many drivers that identify a pattern, e.g., the drivers' behaviors on particular road sections indicate that there is a pothole to avoid, natural language processing of conversations in a vehicle that provide insight to road conditions or attributes (positive and negative), explicitly provided information from drivers such as from surveys or requests for feedback, a history of external dynamic conditions such as weather and lighting, and current maps and route information.

Maps 204 enriched with security information, are the knowledge base 206 of the system 200. Thus, the learning module 202 can update or enhance already existing maps with additional security/safety information based on information received by the learning module 202. Thus, the system 200 has enhanced maps 204 that can be provided that include security/safety information when displayed to a driver.

The system 200 also includes a route planner 208 that can suggest the most appropriate route based also on security conditions. The suggested route can be recalculated when dynamic conditions change, and therefore also security conditions change. Inputs of the route planner can include, for example, a) User-related data (e.g. user's preferences—including safety preferences), b) Dynamic information implying safety conditions (driving style, weather, light, and the like), c) Current position and destination, and e) Driver's and car's recognition (providing information such as the type of vehicle, the driver's health condition, car's equipment etc.). Thus, the route planner 208 can collect dynamic information as it is occurring or soon thereafter. This type of information is dynamic in that it a) may be specific to a particular driver and not another or b) relates to data that changes over the course of days or even hours and minutes. Examples of dynamic inputs, some of which are mentioned above, can include a user's preferences about what should trigger an alert, the destination of the current route, a current location or position during travel, a type of vehicle that is being operated that is receiving the route map, a driver's style of driving that can be deduced from speed, acceleration, braking, centripetal forces, etc., current weather conditions, future weather conditions synchronized in time with expected time of arrival at different parts of the route, current light conditions, and current traffic conditions.

As described above, a number of inputs can be received from sensors that are located within or on a vehicle. The information can be collected from a number of drivers over a period of time to deduce static input information about a road or route and the same information can sometimes be used for the current driver or vehicle to provide dynamic input information.

Because the dynamic input to the route planner 208 continues to be collected while the route is being traversed, the suggested route 212 can be recalculated when dynamic conditions change, and therefore also the security/safety conditions change. Thus, the route planner 208 can provide updated suggested routes 212 along with other dynamic information. A driving assistance module 210 can either use the route information, or can work in real time mode when no destination is set, and just base its processing on the current position. Thus, within a vehicle, the driving assistance module 210 can display the enhanced maps 204 having security/safety information. Accordingly, the driving assistance module 210 can provide real time information regarding the security/safety of the route being traveled to help prevent accidents from occurring.

For analysis, the learning module 202 can include an update module that can split a map into security areas whose size is defined based on security homogeneous characteristics: e.g. a segment of unsealed road, a dangerous turn, a historically dangerous cross or a segment of road inhibited to cars. The map may already be logically segmented into a plurality of adjacent cells.

Map security areas can overlap each other: e.g. a same segment of road can be dangerous for motorbikes and cars because of a bussluse, but can be safe for a SUV as long as the visibility is good. A steep slope can be dangerous for a long vehicle but not for a car. A same segment of road can become dangerous for a car during spring because of wild animals crossing.

The definition of the security areas can be accomplished by expanding the security information in terms of space, and by tagging the original map cells with attributes that can be later utilized by the system 200. The map update process can identify areas on the map that are homogeneous for specific security attributes.

For example, accidents by a particular vehicle type can be identified. Starting from a road segment having car accidents' records, an area of 500 mq can be identified in the map around each accident. Accident areas closer then 500 m from each other can be merged into one. Once the areas have been identified, they can be tagged as dangerous for a vehicle class (e.g., cars). The same algorithm can be applied for different classes of vehicle, thus obtaining different security areas.

Other security areas can be identified by accident occurring in similar weather conditions. Accidents can be analyzed to understand if there is a specific weather trigger, such as fog or rain. A further tag can be applied indicating the potential trigger.

Another security area criteria or attribute may correlate accidents with visibility conditions. Accidents can be analyzed to understand if there is a specific visibility trigger, such as night, sunset, sunrise etc. A further tag can be applied indicating the potential trigger.

Uneven, bumpy or unpaved roads may identify security areas. Starting from information provided by external services (Google etc.), or by the information captured by the vehicles' sensors, security areas can be identified as "uneven road".

Figure 3:
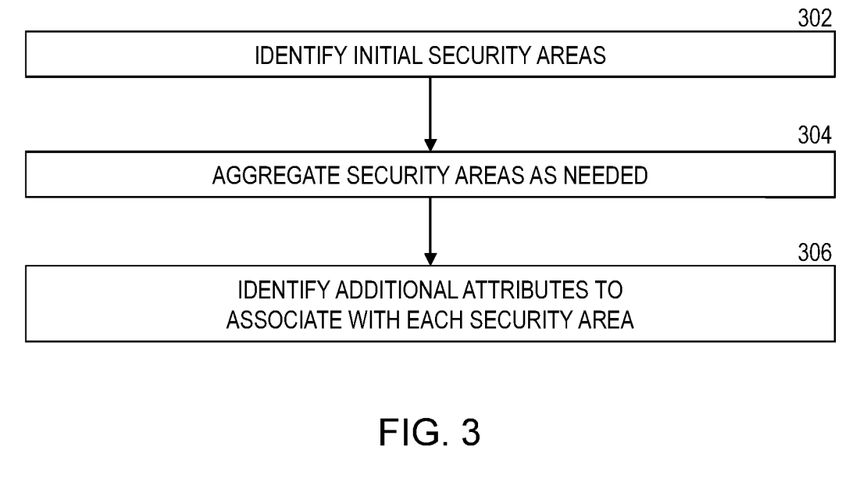
FIG. 3 is a flowchart of an example process for enhancing a map in accordance with the principles of the present disclosure.

In general, the process of identifying security areas can involve locating security attributes on a map and refining the areas through multiple iterations of the algorithms. The process can start in step 302 by using the attributes identified above related to accidents to identify initial security areas or locations on the map. Then, for each attribute (e.g. accident records for cars, uneven road etc.), a 500 mq zone can be identified around the location (this value can be further optimized to take in consideration high density contexts like cities with respect to low density contexts like an open deserted area). For the same attribute, step 304 can continue so that security areas that are closer than 500 m, for example, can be merged into one security area. At the end of this step, groups of homogeneous security areas are identified. Different groups can be made of overlapping areas on the map.

The process can continue in step 306 by further refining the security areas determined in step 304. For each additional security attribute detailing the identified security context (e.g. weather conditions for accidents, visibility, traffic etc.), an additional processing step can be performed to further divide the existing areas based on the new information (e.g. for a particular zone in the security area most of the accidents occurred during raining conditions).

At the end of the analysis process, the map is divided in security areas, each one with a specific set of tags indicating the security information relevant for the area. For example, an area can have a tag indicating a steep slope and a second tag indicating that it's a danger for long vehicles. Another security area can have a tag indicating an uneven road, a tag indicating that it is a danger for motorbikes, and a tag indicating it is a danger in case of rain for any vehicle. Other example security areas can be tagged as a steep incline, a steep decline, an intersection of roads, a curve, a road hazard, etc.

Thus, the resulting map can then be represented as a set of security areas, each one having a set of security tags indicating the potential relevance of the area for the traversing vehicle and the driver. The map would include multiple security areas, {Sa(1) ... Sa(n)} and each security area would include one or more security tags Sa(x)={Stag(1) ... Stag(m)}.

The information discussed above can include historical data such as accidents that occurred, users' feedback, asphalt conditions, etc. that may change frequently. Therefore, when an update of an already enhanced map is performed such that a new enhanced map is generated, only this type of information about a cell may need to be updated. These kinds of changes, when considered individually, have a lower impact on the risk calculation about a cell but when considered in aggregate, they potentially have a much greater impact. Thus, updates can be scheduled so that they occur periodically with enough time between updates for the data to be helpful. For example, an update need not be generated for each new accident but can be generated after x accidents have occurred since the last update or 60 days have passed since the last update.

The security areas of a map can be given a score indicative of a risk factor. One of ordinary skill will recognize that a wide variety of scoring or ranking schemes could be used without departing from the scope of the present disclosure. In the discussion below, a particular scoring scheme is provided merely by way of example. Embodiments in accordance with the principles of the present disclosure are not intended to be limited to this example embodiment. Rather, the example embodiment is provided as a platform to explain the principles underlying the present disclosure.

For example, a score from 0 to 10 can be given to any security area considered to be relevant to security/safety of a route. The score is indicative of an objective risk factor, based on the type of risk (a value from 0 to 10 determined by system designer). As explained below, the resulting value can later be used by a decision module, which based on real-time information (e.g., weather, light conditions, traffic, type of vehicle and driving style) can compute a more accurate and customized score for the element of a security area. The decision module can be part of the route planner module 208 depicted in FIG. 2. This customized risk score, or current risk score, can be temporarily stored as a vector of elements composing a possible route.

Figure 4:
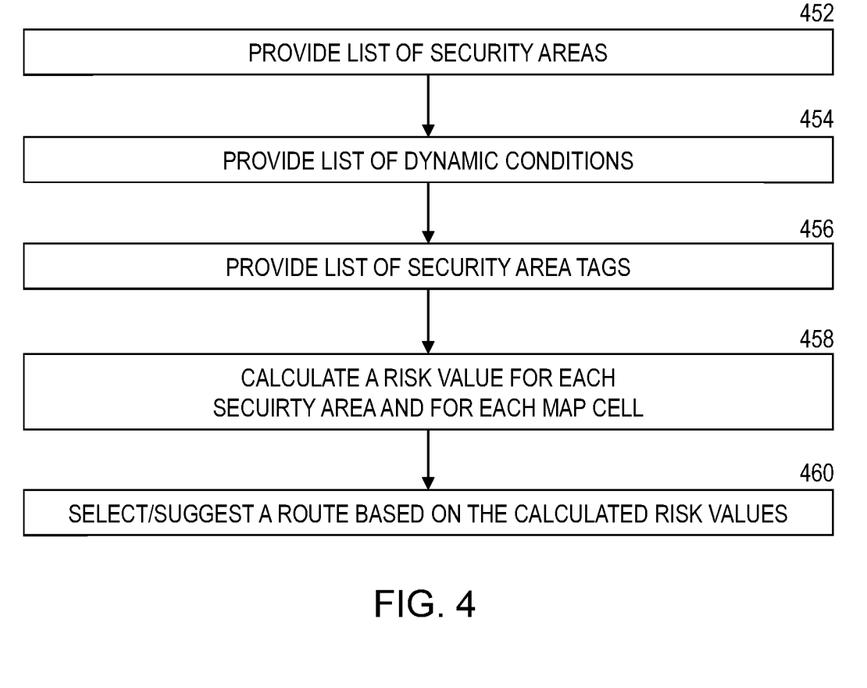
FIG. 4 is a flowchart of an example process for calculating a risk score for a route in accordance with the principles of the present disclosure.

One example algorithm that the decision module can use to compute the current risk score, based on the dynamic conditions could operate as shown in the flowchart of FIG. 4. In step 452 a security areas, such as: hole, curve, hill, crossing, gravel road, etc. is provided as input to the algorithm and in step 454 a list of dynamic conditions, such as time of day, weather, traffic, car type, driver's style, driver's health, etc. is provided as input to the algorithm. Additional inputs, provided in step 456, can also include a list of security area tags (indicating the relevant security area attributes characterizing the area (e.g., raining conditions draining, asphalt, artificial lightening, etc.) Each of the conditions provided as input can be defined to have possible values or be a specific numerical range. Examples include:
 a. Time of day={day, night, sunset, sunrise}
 b. Weather={ice, snow, rain, sunny}
 c. Car Type={SUV, truck, sports car, compact car}
 d. Car's adds-on={snow tires, 4WD, ABS}
 e. Driver's style={sport, experienced, learner}
 f. Driver's heath={poor eyesight, low reflexes}
 g. Direction of Travel={North, South, East, West}

One of ordinary skill will readily recognize that other conditions and enumerated values can be considered when evaluating a security area. The algorithm can then, in step 458, calculate a risk modifier as a function of the dynamic condition(s) and static conditions(s). For example, a basic function can be to only use a weight assigned to security tag (i.e., security attributes) valid for the dynamic condition (e.g., raining tag does not apply to a sunny day) based on the element type, the dynamic conditions, and the static conditions. Mathematically, the risk value for security area n can be represented as $Risk(n)=\Sigma f(x, y, z)$ where x=security area, y=dynamic conditions, z=static conditions. A system designer can initially set arbitrary rules for defining $f(x, y, z)$ based on subject matter expertise or statistical analysis. Such analysis would correlate historical outcome information with the input criteria to arrive at a function that accurately calculates a risk value for a security area. In step 458, the risk value for a map cell (that may include a number of security areas) can be calculated by summing each of the individual risk values for all of the security areas in the cell such that $Risk(cell)=\Sigma Risk(n)$, where x applies to the cell.

Using a subset of variables as an example, analysis can derive pertinent correlations such that, for example, Risk (security area)=f1(weather conditions, asphalt type, security area)+f2(time of day, artificial lightening, security area)+f3 (vehicle, security area). One example cell may have a curve and hole and thus, $$Risk(\text{cell with curve and hole}) = Risk(\text{curve}) + Risk(\text{hole}).$$

Accordingly, if an example scenario involved: at sunset, with rain and with draining asphalt, no artificial lightening, on a SUV, the risk value for the cell could be calculated as:

$$Risk(\text{curve}) = f1(\text{rain,draining asphalt,curve}) + f2(\text{sunset,no artificial lightening,curve}) + f3(\text{SUV,curve})$$

$$Risk(\text{hole}) = f1(\text{rain,draining asphalt,hole}) + f2(\text{sunset, no artificial lightening,hole}) + f3(\text{SUV,hole}).$$

The risk values can be used by the route planner module 208 to play a factor in suggesting possible routes to a driver or another occupant of a vehicle, in step 460. As for using the risk values to suggest a route, the cells through which a potential route passes are identified. A user or driver can decide a maximum threshold, that none of the segments in the path must exceed, possibly combined with an average risk score they are willing to accept to reach the destination. The score computed is a weighted arithmetic mean where the values are the risk coefficients and the weights are the lengths of the segments. Route segments which exceed the maximum threshold are not included in any suggested route nor are any routes where an average risk value for that route exceeds the average risk score. The route planner can also include two different, alternative segments in the same route so that a user could see comparative information such as even though one segment is slightly riskier than another, the traffic is much heavier, or the distance is much greater. Thus, the driver can consider additional information when selecting from alternative routes.

As described above, embodiments in accordance with the principles of the present disclosure can include a method, system, or computer program product that enhances navigation assistance systems with real-time security/safety related data about a particular route or location of a vehicle. The representative method includes receiving, by a computer, a map comprising one or more security areas and receiving dynamic information about respective conditions related to each of the one or more security areas. For example, the dynamic information can include a driver's current health or the type of vehicle a user is travelling in. The method also includes receiving respective security attributes related to each of the one or more security areas. The security attributes can, for example, be attributes that are correlated with accidents within a security area based on historical data (e.g., raining, nighttime, sunset, motorcycle, etc.). The security attributes can also include information related to a geometrical-related feature of the road such as, for example, the road being a curve, a steep incline, a steep decline, and intersection, etc. In accordance with the method, a respective risk value can be calculated for each of the one or more security areas based on the respective conditions and the respective security attribute of the security area then risk-related information can be transmitted to a user device associated with a user, wherein the risk-related information is based on a current location of the user device and the respective risk values. As one example, the risk-related information can include alerts to be provided via the user device, wherein the alerts include one or more of: audio alerts, textual alerts, visual alerts, or overlay information for display on a graphical map being displayed to the user. Alternatively, the risk-related information can include a suggested route from the current location to a destination.

Thus, the method can also include determining by the computer, for each of a plurality of alternative routes from the current location to the destination, which of the one or more security areas are traversed by a particular alternative route; and then calculating a respective risk score for each of the plurality of alternative routes based on the one or more security areas traversed by the particular alternative route. Furthermore, the suggested route has a respective risk value indicative of being less of a risk than a predetermined risk level identified by the user. In some instances, the suggested route comprises a plurality of segments each having a corresponding risk value, wherein none of the plurality of segments has a corresponding risk value indicative of being a higher risk than a predetermined risk level identified by the user.

Figure 5:
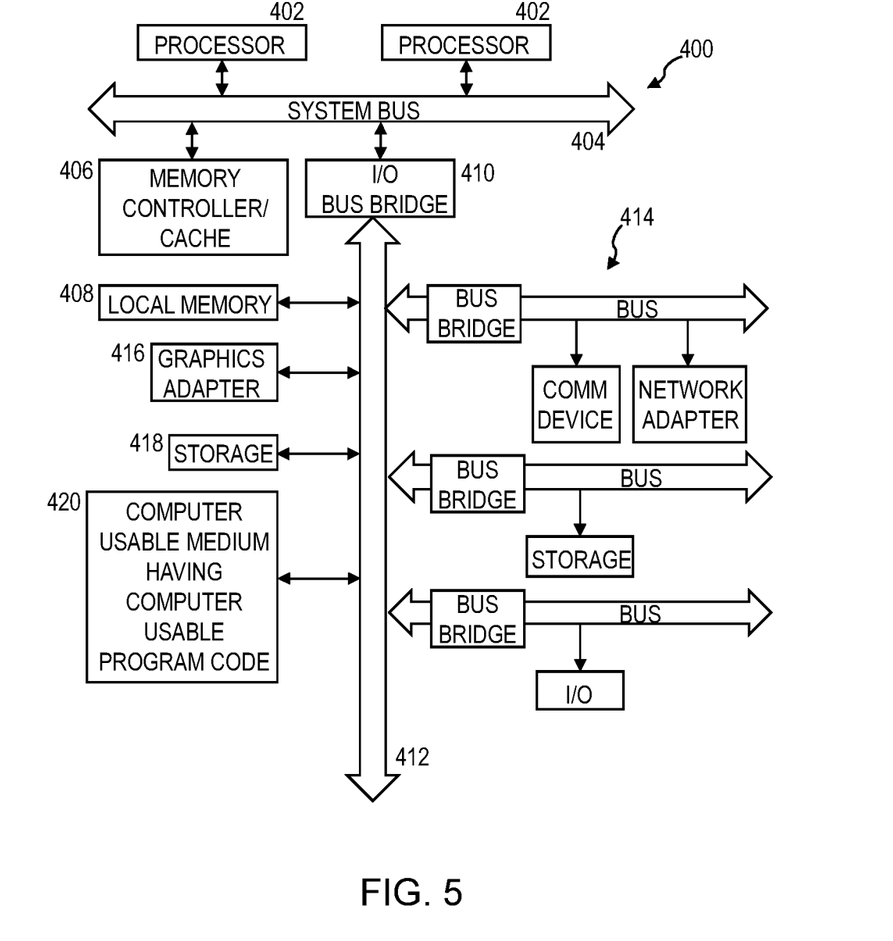
FIG. 5 depicts a block diagram of a data processing system in accordance with the present disclosure.

Referring to FIG. 5, a block diagram of a data processing system is depicted in accordance with the present disclosure. A data processing system 400, such as may be utilized to implement the hardware platform 200 or aspects thereof e.g., as set out in greater detail in FIG. 2, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 4. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computer, a map comprising a plurality of security areas;
   receiving, by the computer, dynamic information about respective conditions related to each of the plurality of security areas;
   receiving, by the computer, respective security attributes related to each of the plurality of security areas;
   calculating, by the computer, a respective risk value for each of the plurality of security areas based on the respective conditions and the respective security attribute of the security area; and
   transmitting, by the computer to a user device associated with a user, risk-related information based on a current location of the user device and the respective risk values, wherein
   the risk-related information comprises a suggested route from the current location to a destination,
   each of the plurality of security areas having a size defined based on a security homogeneous characteristic,
   each of the plurality of security areas have a specific security tag used to respectively define the plurality of security areas,
   at least one of the plurality of security areas have a specific set of security tags, and
   at least two of the plurality of security areas overlap.

2. The computer-implemented method of claim 1, wherein the risk-related information comprises alerts to be provided via the user device.

3. The computer-implemented method of claim 2, wherein the alerts include one or more of: audio alerts, textual alerts, visual alerts, or overlay information for display on a graphical map being displayed to the user.

4. The computer-implemented method of claim 1, further comprising:
   determining, by the computer, for each of a plurality of alternative routes from the current location to the destination which of the plurality of security areas are traversed by a particular alternative route; and
   calculating, by the computer, a respective risk score for each of the plurality of alternative routes based on the plurality of security areas traversed by the particular alternative route.

5. The computer-implemented method of claim 4, wherein the suggested route has a respective risk value indicative of being less of a risk than a predetermined risk level identified by the user.

6. The computer-implemented method of claim 4, wherein the suggested route comprises a plurality of segments each having a corresponding risk value and wherein none of the plurality of segments has a corresponding risk value indicative of being a higher risk than a predetermined risk level identified by the user.

7. The computer-implemented method of claim 1, wherein the dynamic information comprises a type of vehicle in which the user is traveling.

8. The computer-implemented method of claim 1, wherein the security attributes comprise one or more of: static information about street, historical information about accidents, or historical dynamic information.

9. The computer-implemented method of claim 1, wherein the security attributes comprise a geometrical-related feature of a road within a particular security area.

10. A system, comprising:
    a processor programmed to initiate executable operations comprising:
      receiving a map comprising plurality of security areas;
      receiving dynamic information about respective conditions related to each of the plurality of security areas;
      receiving respective security attributes related to each of the plurality of security areas;
      calculating a respective risk value for each of the plurality of security areas based on the respective conditions and the respective security attribute of the security area; and
      transmitting to a user device associated with a user, risk-related information based on a current location of the user device and the respective risk values, wherein
    the risk-related information comprises a suggested route from the current location to a destination,
    each of the plurality of security areas having a size defined based on a security homogeneous characteristic,
    each of the plurality of security areas have a specific security tag used to respectively define the plurality of security areas,
    at least one of the plurality of security areas have a specific set of security tags, and
    at least two of the plurality of security areas overlap.

11. The system of claim 10, wherein the risk-related information comprises alerts to be provided via the user device.

12. The system of claim 11, wherein the alerts include one or more of: audio alerts, textual alerts, visual alerts, or overlay information for display on a graphical map being displayed to the user.

13. The system of claim 10, wherein the processor is programmed to initiate executable operations further comprising:
    determining for each of a plurality of alternative routes from the current location to the destination which of the plurality of security areas are traversed by a particular alternative route; and
    calculating a respective risk score for each of the plurality of alternative routes based on the plurality of security areas traversed by the particular alternative route.

14. The system of claim 13, wherein the suggested route has a respective risk value indicative of being less of a risk than a predetermined risk level identified by the user.

15. The system of claim 13, wherein the suggested route comprises a plurality of segments each having a corresponding risk value and wherein none of the plurality of segments has a corresponding risk value indicative of being a higher risk than a predetermined risk level identified by the user.

16. The system of claim 10, wherein the dynamic information comprises a type of vehicle in which the user is traveling.

17. The system of claim 10, wherein the security attributes comprise one or more of: static information about street, historical information about accidents, or historical dynamic information.

18. A computer program product, comprising:
a computer readable storage medium having program code stored thereon, the program code executable by a data processing system to initiate operations including:
receiving, by the data processing system, a map comprising plurality of security areas;
receiving, by the data processing system, dynamic information about respective conditions related to each of the plurality of security areas;
receiving, by the data processing system, respective security attributes related to each of the plurality of security areas;
calculating, by the data processing system, a respective risk value for each of the plurality of security areas based on the respective conditions and the respective security attribute of the security area; and
transmitting, by the data processing system to a user device associated with a user, risk-related information based on a current location of the user device and the respective risk values, wherein
the risk-related information comprises a suggested route from the current location to a destination,
each of the plurality of security areas having a size defined based on a security homogeneous characteristic,
each of the plurality of security areas have a specific security tag used to respectively define the plurality of security areas,
at least one of the plurality of security areas have a specific set of security tags, and
at least two of the plurality of security areas overlap.

* * * * *